(12) United States Patent
Wipf et al.

(10) Patent No.: US 7,757,777 B1
(45) Date of Patent: Jul. 20, 2010

(54) SEGMENTED CLOSING WHEEL

(75) Inventors: Danny Wipf, Lake Andes, SD (US); Joseph Hofer, Lake Andes, SD (US)

(73) Assignee: Lakeview Hutterian Brethern, Lakes Andes, SD (US)

(*) Notice: Subject to any disclaimer, the term of this patent is extended or adjusted under 35 U.S.C. 154(b) by 0 days.

(21) Appl. No.: 12/291,821

(22) Filed: Nov. 13, 2008

(51) Int. Cl.
*A01B 15/10* (2006.01)

(52) U.S. Cl. .................... 172/604; 111/192

(58) Field of Classification Search ......... 172/753, 172/762, 769, 766, 765, 772.5, 772, 535, 172/538, 556, 540, 604, 681; 111/191, 192, 111/193, 190, 195, 139–149, 164–169, 52, 111/62, 83
See application file for complete search history.

(56) References Cited

U.S. PATENT DOCUMENTS

| | | | |
|---|---|---|---|
| 377,356 A | 1/1888 | Evans | |
| 386,191 A | 7/1888 | Ferris | |
| 396,863 A | 1/1889 | Dwyre | |
| 518,831 A | 4/1894 | Bennett | |
| 5,205,228 A | 4/1993 | Mitchell | |
| 5,341,754 A * | 8/1994 | Winterton | 111/139 |
| 5,398,625 A | 3/1995 | Johnson et al. | |
| 5,443,023 A | 8/1995 | Carroll | |
| 5,497,717 A | 3/1996 | Martin | |
| 5,645,000 A | 7/1997 | Carroll | |
| 5,697,455 A | 12/1997 | Deckler | |
| 5,896,932 A | 4/1999 | Bruns et al. | |
| 5,970,891 A | 10/1999 | Schlagel | |
| 6,119,608 A * | 9/2000 | Peterson et al. | 111/192 |
| 6,314,897 B1 * | 11/2001 | Hagny | 111/192 |
| 6,530,334 B2 * | 3/2003 | Hagny | 111/189 |

* cited by examiner

*Primary Examiner*—Robert E Pezzuto
(74) *Attorney, Agent, or Firm*—Jeffrey A. Proehl; Woods, Fuller, Shultz & Smith, PC

(57) ABSTRACT

A segmented furrow closing wheel comprises a body member rotatable about a rotation axis. The body member comprises a hub and a plurality of fingers radiating from the hub. Each of the fingers has a root end connected to the hub, and each of the fingers terminate at a radially outermost end with a contact surface for contacting a contact patchy on the ground surface. The contact surface of one of the fingers being spaced from the contact surfaces of the adjacent fingers of the plurality of fingers. The contact surface is blunt in character.

18 Claims, 4 Drawing Sheets

SEGMENTED CLOSING WHEEL

BACKGROUND

1. Field

The present disclosure relates to closing wheels and more particularly pertains to a new segmented closing wheel for effectively closing the furrow while not producing a compacted layer of soil at the soil surface.

2. Description of the Prior Art

The closing of furrows is important to the planting of seeds in fields, especially in fields where no till techniques are being employed. Edges of the top surface of the soil forming the furrow are lifted by the knife of the plow to open the furrow to receive the seed, and the edges of the soil need to be pressed downwardly to close the furrow.

Conventional planters use closing wheels with a continuous circumference formed by a rubber tire that applies a downward force to the opposite edges of the furrow. The rubber tire closing wheels typically operate best with the down pressure set to the maximum adjustment. However, in areas of soil having a higher moisture content, the pressure of the tire can produce significant compaction of the surface and subsurface of the soil along the sides of the furrow as the soil is being pressed back into place. This compaction can cause significant difficulty in the emergence of the plant and the ultimate yield of the crop.

Another approach to the closing wheel employs teeth or spikes that radiate outwardly from a center and terminate in sharp tips that when pressed down on the surface of the soil effectively penetrate through the surface of the soil. It is believed that this approach does not effectively close the furrow.

Therefore is believed to be a need for a closing wheel that does not produce significant compaction of the soil along the furrow while is still effective for closing the furrow.

SUMMARY

In view of the foregoing disadvantages inherent in the known types of closing wheels now present in the prior art, the present disclosure describes a new segmented closing wheel which may be utilized for effectively closing the furrow while not producing a compacted layer of soil at the soil surface.

The present disclosure relates to a segmented furrow closing wheel comprising a body member rotatable about a rotation axis. The body member comprises a hub and a plurality of fingers radiating from the hub. Each of the fingers has a root end connected to the hub. Each of the fingers terminates at a radially outermost end with a contact surface for contacting a contact patch on the ground surface. The contact surface of one of the fingers being spaced from the contact surfaces of the adjacent fingers of the plurality of fingers. The contact surface is blunt in character.

In another aspect, the disclosure relates to a method of closing the sides of a furrow in the surface of soil. The method includes providing a segmented closing wheel with a plurality of fingers having outer ends, with the outer ends having contact surfaces; and pressing the contact surfaces of the fingers against spaced locations on the surface of the soil in a line on a side of the furrow.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components as well as the particulars of the steps set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
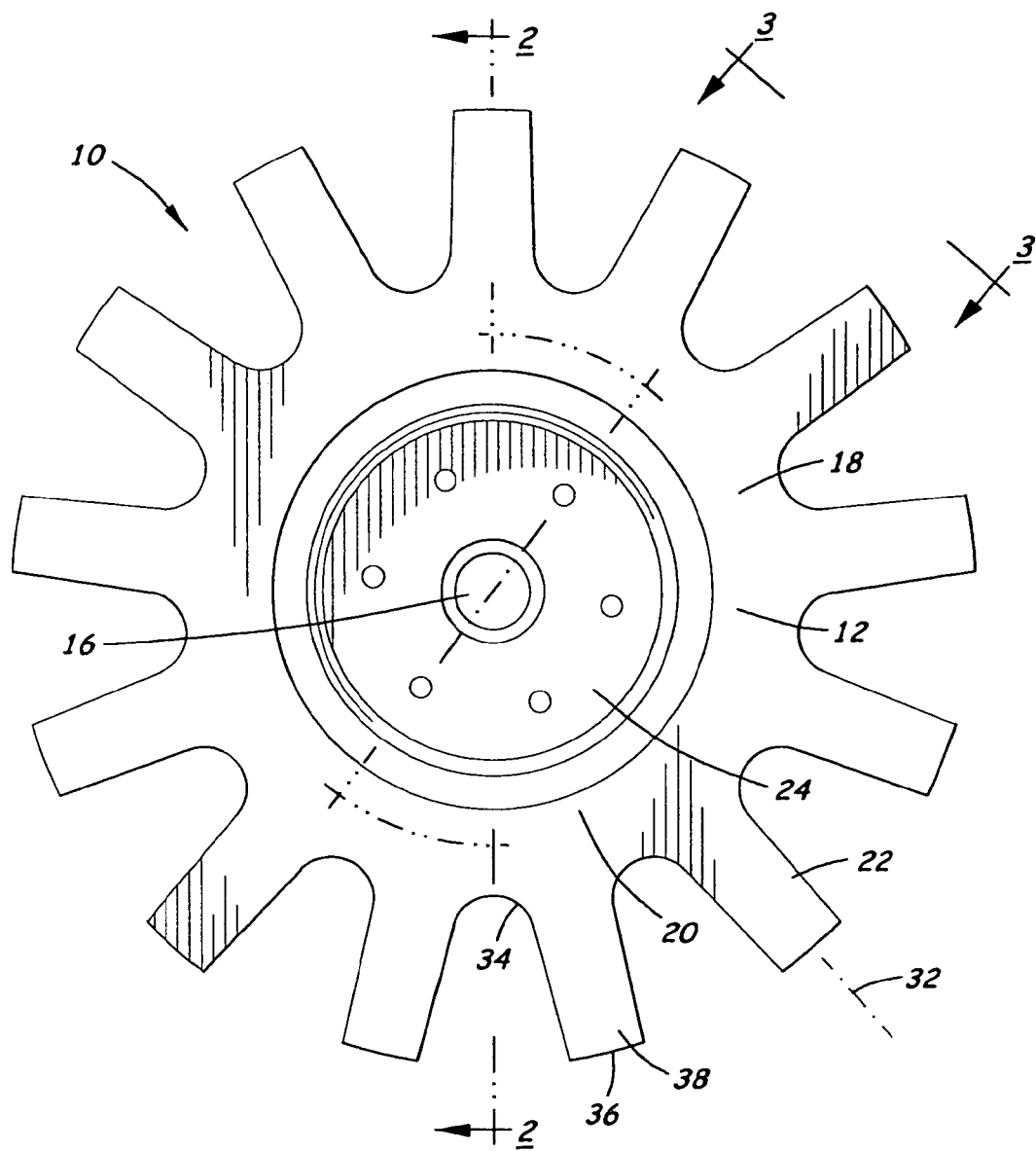
FIG. 1 is a schematic front side view of a new segmented closing wheel according to the present disclosure.
Figure 2:
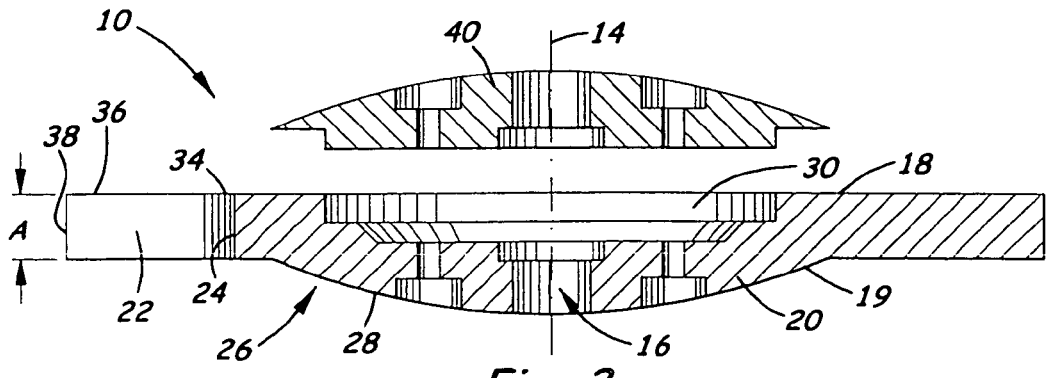
FIG. 2 is a schematic sectional view of the closing wheel taken along line 2-2 of FIG. 1 and showing the retainer in an exploded position with respect to the body member.
Figure 3:
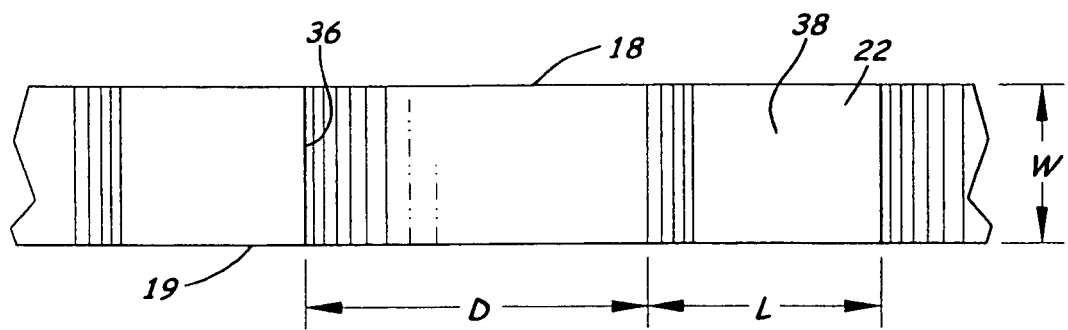
FIG. 3 is a schematic edge view of a portion of the closing wheel.
Figure 4:
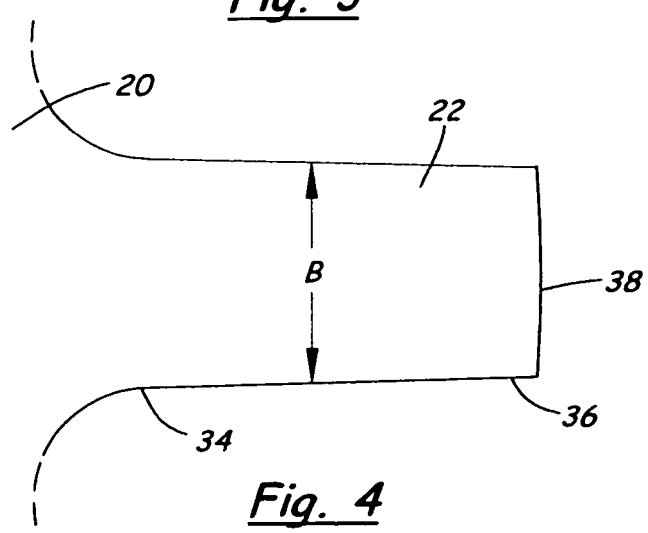
FIG. 4 is a schematic partial front side view of the closing wheel showing the detail of one of the fingers of the wheel.
Figure 5:
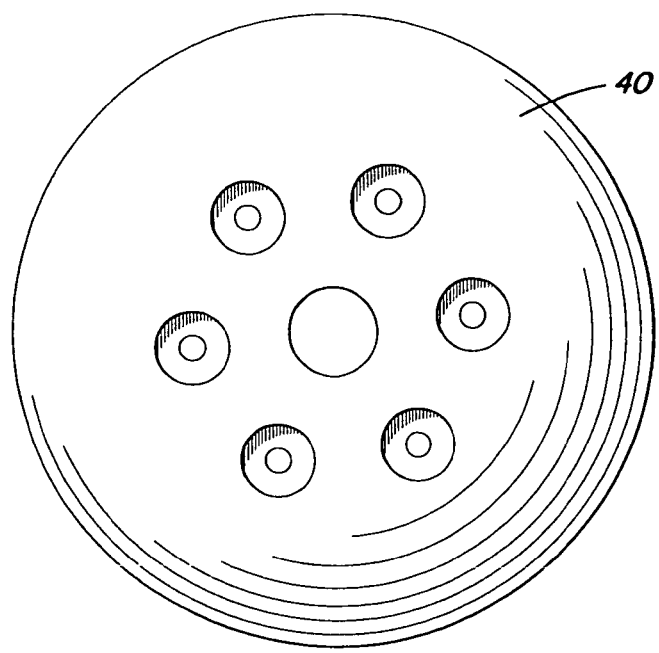
FIG. 5 is a schematic front side view of the retainer for the closing wheel.
Figure 6:
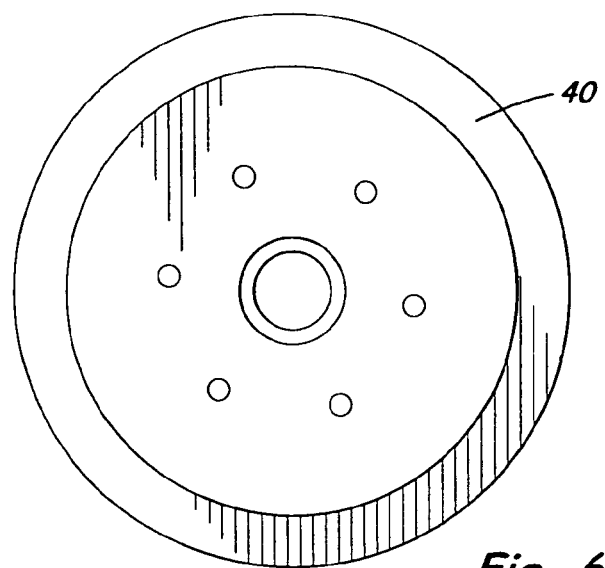
FIG. 6 is a schematic back side view of the retainer.
Figure 7:
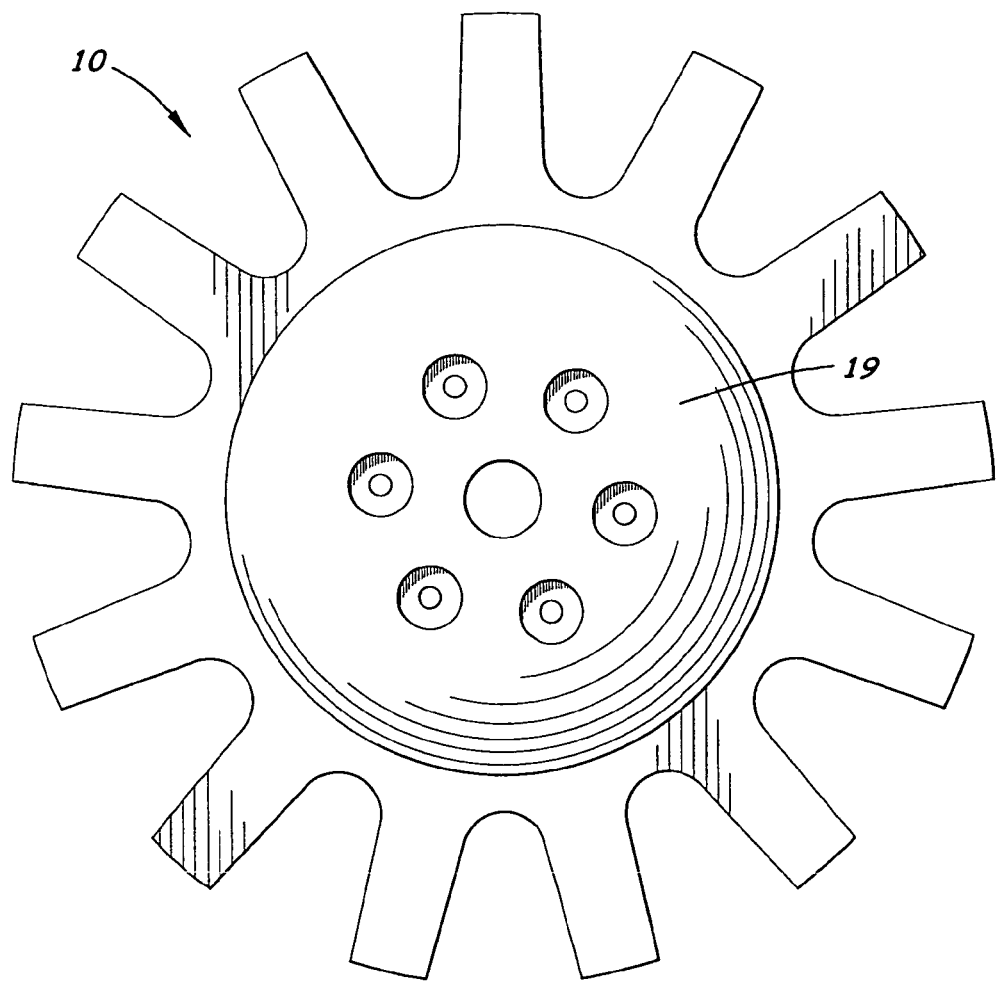
FIG. 7 is a schematic rear side view of the closing wheel.
Figure 8:
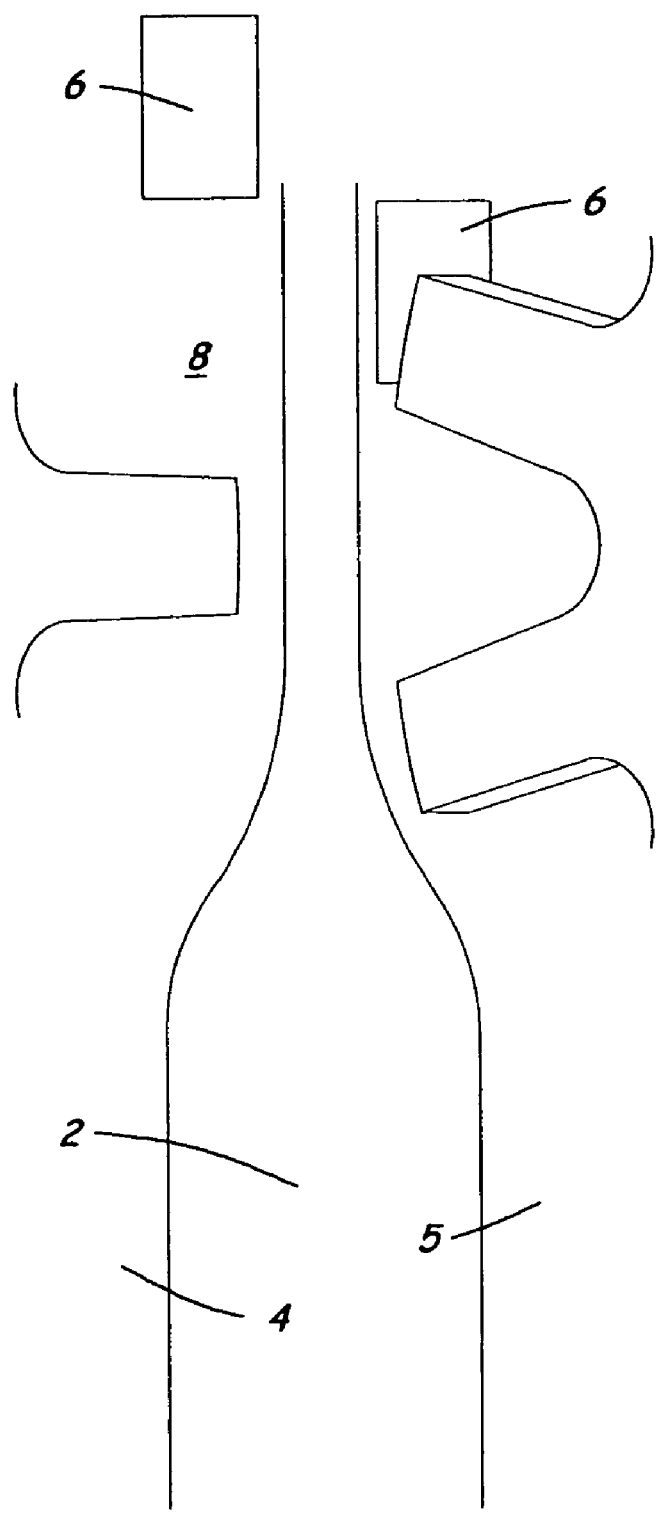
FIG. 8 is a schematic top view of a furrow being closed with two closing wheels.

With reference now to the drawings, and in particular to FIGS. 1 through 8 thereof, a new segmented closing wheel embodying the principles and concepts of the disclosed subject matter will be described.

A furrow closing wheel 10 of the disclosure is mountable on an implement intended to close a furrow 2 that has been opened in the soil, such as by a plow blade, and as an example the closing wheel 10 may be mounted on a planter. In many applications, the closing wheel of the disclosure may replace another closing wheel of a conventional rubber tired type with little or no modification or addition to the implement. The furrow closing wheel 10 is typically (although not necessarily) mounted in a pair on the implement in a manner so that each closing wheel contacts one respective side 4, 5 of the furrow 2.

The furrow closing wheel 10 may comprise a body member 12 that is rotatable about a rotation axis 14. The body member 12 has a center 16 through which the rotation axis 14 passes and about which the body member is rotatable. The body member 12 is further characterized by having first 18 and second 19 opposite faces.

In general, the body member 12 comprises a hub 20 and a plurality of fingers 22 that radiate outwardly from the hub. The hub 20 of the body member 12 has a periphery 24 which may be substantially circular in nature although this is not critical. The hub 20 may have a thickness dimension that is measured in a direction substantially parallel to the rotation axis 14. The hub 22 has a central region 26, which may be substantially circular in shape. The central region 26 may have a first surface 28 located on the first opposite face 18 of the body member 12, and a second surface 30 on the second opposite face 19 of the body member. In some embodiments of the body member 12, the first surface 28 may be depressed or sunken inward from a plane of the first opposite face 18, and the second surface 30 may be raised or protruded from the plane of the second opposite face 19.

Turning to the plurality of fingers 22 of the body member 12, each of the fingers may extend along a separate radial axis 32 that radiates outwardly from the center 16 of the body member. Each of the fingers 22 has a root end 34 that is connected to the hub 20 and a free outermost or outer end 36. In the illustrative embodiment, the plurality of fingers comprises 13 fingers. Those skilled in the art will recognize that more or fewer fingers may be utilized, for example, on wheels with larger or smaller diameters or with larger or smaller contact surfaces or spacing. The fingers may have a length measured between the root end 34 and the outer end 36, and the length of the finger may be between approximately 20 percent and approximately 80 percent of the distance between the outer end 36 and the center 16 of the body member 12.

Each of the fingers 22 terminates at the radially outermost end 36 with a contact surface 38 that is situated to contact a contact patch 6 on the ground surface 8. Significantly, the contact surface 38 is relatively blunt and has difficulty making any significant penetration of the soil surface, and any penetration of the ground surface 8 at the contact patch may be relatively insubstantial due to the blunt character. The contact surface 38 may be substantially planar in character, and the plane of the contact surface 38 of the finger 22 may be oriented substantially perpendicular to the radial axis 32. An optional but less preferred embodiment has a contact surface 38 that has a slight curvature about the rotation axis.

The contact surface 38 is further characterized by a width W that may be measured in a direction parallel to the rotation axis 14. The contact surface 38 may also be characterized by a length L that may be measured in a circumferential direction of the body member 12. In some embodiments of the wheel 10, the length L of the contact surface 38 is different than the width W, and the length may be greater than the width. The width W may be between approximately 0.3 and approximately 0.5 times the length L, although other ratios of sizes outside of this range may be employed. The width W may be greater than approximately 0.5 inches, and in some embodiments may be between approximately 0.5 inches and 1 inch, and in some embodiments may be approximately 0.75 inches. The length L may be greater than approximately 1 inch, and in some embodiments may be between approximately 1 inch to approximately 1⅜ inches, and in some embodiments may be between approximately 1⅛ inches to approximately 1¼ inches.

Each of the fingers 22 has a first dimension A that is measured in a direction parallel to the rotation axis 14, and a second dimension B that is measured in a direction oriented perpendicular to the first dimension and perpendicular to the radial axis 32. The first dimension A of the finger 22 may be substantially uniform from the root end 34 to the outer end 36. The second dimension B of the finger 22 may be substantially uniform from the outer end 36 to a location approximately halfway between the outer end 36 and the root end 34. In some embodiments of the wheel 10, the first dimension A is different than the second dimension, and the second dimension may be greater than the first dimension. The first dimension A may be between approximately 0.3 and approximately 0.5 times the second dimension B, although other ratios of sizes outside of this range may be employed. The first dimension A is greater than approximately 0.5 inches, and in some embodiments the first dimension is between approximately 0.5 inches and 1 inch, and in some embodiments the first dimension is approximately 0.75 inches. The second dimension B may be greater than approximately 1 inch, and in some embodiments may be between approximately 1 inch and approximately 1⅜ inches, and in some embodiments the second dimension may be between approximately 1⅛ inches to approximately 1¼ inches. It has been found that a contact patch of dimension within these ranges is highly effective for pushing the soil surface of the side of the furrow into place without any significant degree of penetration of the soil surface. It has also been found that a substantially rectangular shape with 90 degree corners for the contact surface is highly effective for pushing the soil surface of the side of the furrow into place, and that rounding off of the corners of the contact surface, such as might occur from wear of the material forming the finger, tends to increase the possibility of ground surface penetration by the outer end of the finger.

Another significant aspect of the wheel 10 is that the outer ends 36 of the fingers 22 are spaced from each other. The distance D between a pair of adjacent fingers may be substantially equal to or greater than the length L of the contact surface 38 of the finger 22. The distance D between fingers 22 may be between approximately 1.5 and approximately 2 times the second dimension B of the finger 22, although other ratios of spacings may be employed.

The closing wheel 10 may also include a bearing retainer 40 that is removably mountable on the body member 12 and may be configured to hold a bearing in a removable manner on the wheel 10. The bearing retainer 40 may be positionable on one of the faces 18, 19 of the body member 12, and may be mountable in the spaced formed by the depressed central region 26 of the first face 18 formed by the first surface 28. The bearing retainer 40 may be partially positionable in the depression, and may be releasably secured to the body member 12 by fasteners. An inner surface of the bearing retainer 40 and the first surface 28 of the central region 26 may form a nest for removably holding a bearing that may be removed when the bearing retainer 40 is unfastened from the body member 12.

Another aspect of the invention is a method of closing the sides 4, 5 of a furrow 2 in the surface 8 of soil. The method may comprise the step of providing the segmented furrow closing wheel 10 with a plurality of fingers 22 having outer ends 36 with contact surfaces 38. The method may further include pressing the contact surfaces of the fingers against spaced locations on the surface of the soil in a line on a side of the furrow.

The step of providing may include providing a blunt contact surface on the outer ends of the fingers. The step of providing may also include providing a pair of the segmented closing wheels 10 that press on the soil surface on the opposite sides of the furrow. The step of pressing includes pressing the contact surfaces of the fingers of a first one of the closing wheels and the contact surfaces of the fingers of a second one of the closing wheels on the surface of the soil in an alternating manner on opposite sides of the furrow. The contact surfaces of the wheels thus may not press against contact patches that are located laterally next to each other along the furrow. The laterally alternating pattern of contact may produce a "stitched" appearance for the closed furrow.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A segmented furrow closing wheel comprising:
   a body member rotatable about a rotation axis, the body member comprising:
   a hub; and
   a plurality of fingers radiating from the hub, each of the fingers having a root end connected to the hub;
   wherein each of the fingers terminate at a radially outermost end with a contact surface for contacting a contact patch on the ground surface, the contact surface of one of the fingers being spaced from the contact surfaces of the adjacent fingers of the plurality of fingers, the contact surface being blunt in character;
   wherein the contact surface is configured to press against the contact patch on the ground surface without any significant degree of penetration of the ground surface.

2. The wheel of claim 1 wherein the contact surface is substantially planar.

3. The wheel of claim 1 wherein a plane of the contact surface of the finger is oriented substantially perpendicular to a radial axis radiating outwardly from the rotation axis and passing through the contact surface.

4. The wheel of claim 1 wherein the contact surface has a length measured in a circumferential direction; and
   wherein a distance between the contact surfaces of adjacent pair of fingers is equal or greater than a length of the contact surface of at least one of the fingers.

5. The wheel of claim 1 wherein the contact surface has a width measured in a direction parallel to the rotation axis, the contact surface having a length measured in a circumferential direction; and
   wherein the width is different than the length.

6. The wheel of claim 1 wherein the contact surface has a width measured in a direction parallel to the rotation axis, the contact surface having a length measured in circumferential direction; and
   wherein the length is greater than the width.

7. The wheel of claim 1 wherein the contact surface has a width measured in a direction parallel to the rotation axis, the contact surface having a length measured in a circumferential direction; and
   wherein the width is greater than approximately 0.5 inches.

8. The wheel of claim 1 wherein the contact surface has a width measured in a direction parallel to the rotation axis, the contact surface having a length measured in a circumferential direction; and
   wherein the length is greater than approximately 1 inch.

9. The wheel of claim 1 wherein at least one finger of the plurality of fingers extend along a radial axis radiating outwardly from the center of the body member.

10. The wheel of claim 1 wherein each of the fingers has a first dimension measured in a direction parallel to the rotation axis, each of the fingers having a second dimension measured in a direction oriented perpendicular to the first direction and perpendicular to the first direction and perpendicular to the radial axis; and
    wherein the first dimension of the finger is substantially uniform from the outer end to a location approximately halfway between the outer end and the root end.

11. The wheel of claim 1 additionally comprising a bearing retainer removably mountable on the body member to hold a bearing on the body member.

12. The wheel of claim 1 wherein the contact surface has a width measured in a direction parallel to the rotation axis, the contact surface having a length measured in a circumferential direction; and
    wherein the width of the contact surface is greater than approximately 0.5 inches and the length of the contact surface is greater than approximately 1 inch.

13. The wheel of claim 1 wherein the contact surface has a width measured in a direction parallel to the rotation axis, the contact surface having a length measured in a circumferential direction; and
    wherein the width of the contact surface is between approximately 0.5 inches and approximately 1 inch, and the length of the contact surface is between approximately 1 inch and approximately 1⅜ inches.

14. A method of closing the sides of a furrow in the surface of soil, the method comprising:
    providing a segmented closing wheel with a plurality of spaced fingers having outer ends, the outer ends of the fingers being spaced from each other and having blunt and substantially planar contact surfaces; and
    pressing the contact surfaces of the fingers against spaced locations on the surface of the soil in a line on a side of the furrow;
    wherein the pressing of the contact surfaces against the surface of the soil is performed without any significant degree of penetration of the surface by the fingers.

15. The method of claim 14 wherein the step of providing includes providing a pair of the segmented closing wheels positioned in a laterally opposed relationship across the furrow for pressing on the soil surface on the opposite sides of the furrow.

16. The method of claim 15 wherein the step of pressing includes pressing the contact surfaces of the fingers of a first one of the closing wheels and the contact surfaces of the fingers of a second one of the closing wheels on the surface of the soil at laterally alternating locations on opposite sides of the furrow.

17. A segmented furrow closing wheel system for closing the sides of a furrow in the surface of soil, the system comprising:
    a pair of closing wheels mounted so as to be positioned in a laterally opposed relationship on the opposite side of the furrow, each of the closing wheels comprising a body member rotatable about a rotation axis, the body member comprising:

a hub; and a plurality of fingers radiating from the hub, each of the fingers having a root end connected to the hub;

wherein each of the fingers terminate at a radially outermost end with a contact surface for contacting a contact patch on the ground surface, the contact surface of one of the fingers being spaced from the contact surfaces of the adjacent fingers of the plurality of fingers, the contact surface being blunt in character;

wherein the contact surface is configured to press against the contact patch on the ground surface without any significant degree of penetration of the ground surface.

18. The wheel of claim 17 wherein the contact surface has a width measured in a direction parallel to the rotation axis, the contact surface having a length measured in a circumferential direction; and wherein the width of the contact surface is greater than approximately 0.5 inches and the length of the contact surface is greater than approximately 1 inch.

* * * * *